United States Patent [19]

Krumweide

[11] 4,083,325

[45] Apr. 11, 1978

[54] APPARATUS FOR CONTINUOUSLY COATING A LARGE STRUCTURE WITH A UNIFORM FOAM LAYER

[75] Inventor: Gary C. Krumweide, San Diego, Calif.

[73] Assignee: General Dynamics Corporation, San Diego, Calif.

[21] Appl. No.: 710,040

[22] Filed: Jul. 30, 1976

Related U.S. Application Data

[63] Continuation-in-part of Ser. No. 502,586, Sep. 3, 1974, abandoned.

[51] Int. Cl.² .................... B05B 11/10; B05C 5/02
[52] U.S. Cl. .................... 118/315; 118/320; 156/78; 264/46.2; 427/373
[58] Field of Search ............ 118/DIG. 11, 225, 315, 118/320, 324, 323; 427/244, 264, 270, 277, 373; 156/77, 78, 79; 502/586; 264/42, 45.7, 46.2, 45.8, 54, 46.1, 46.7

[56] References Cited

U.S. PATENT DOCUMENTS

| | | | |
|---|---|---|---|
| 2,470,068 | 5/1949 | Contenson | 118/DIG. 11 |
| 2,770,864 | 11/1956 | Weese | 264/42 |
| 3,564,085 | 2/1971 | Schickedanz | 264/46.2 X |
| 3,793,102 | 2/1974 | Day | 156/78 |
| 3,880,559 | 4/1975 | Peille | 264/46.2 X |
| 3,942,925 | 3/1976 | Schmitzer et al. | 264/46.2 X |

*Primary Examiner*—Louis K. Rimrodt
*Attorney, Agent, or Firm*—John R. Duncan

[57] ABSTRACT

An apparatus for continuously coating a large surface with a foam layer having uniform low density and uniform thickness. The coating apparatus is positioned adjacent to the surface to be coated, with the surface movable past the apparatus in a direction substantially in the plane of the surface. The coating apparatus includes a plurality of self-rising foamable liquid application means for continuously applying the liquid to the surface. Immediately downstream, a screen positioning means moves a screen substantially parallel to the surface without relative motion therebetween. As the foam rises, it penetrates slightly through the screen and cures to a self-sustaining state. A rotatable brush then engages the upper surface of the screen to abrade and comminute the excess foam extending through the screen. Further means are provided to remove the comminuted excess foam and to lift the screen and any remaining excess foam away from the surface of the resulting uniform foam layer.

5 Claims, 4 Drawing Figures

APPARATUS FOR CONTINUOUSLY COATING A LARGE STRUCTURE WITH A UNIFORM FOAM LAYER

CROSS-REFERENCE TO RELATED APPLICATION

This application is a continuation-in-part of copending U.S. Pat. Application Ser. No. 502,586, filed Sept. 3, 1974 now abandoned.

BACKGROUND OF THE INVENTION

This invention relates in general to the application of foam coatings suitable for thermal insulation, and more specifically to the formation of low density foam coatings of uniform density and thickness.

Highly efficient thermal insulation materials are becoming increasingly necessary for applications such as cryogenic fuel tanks in high energy space launch vehicles, liquefied natural gas storage tanks, ships for transporting liquefied natural gas, and other similar applications. The insulation must be highly efficient, light in weight, and reasonably inexpensive to apply and maintain over very large structures.

Many insulation systems are in use today. While many, such as asbestos packing, glass fiber batts, etc., are useful when the temperature difference within and without an insulated structure is not great, most of these are unacceptable for use with cryogenic tanks where this temperature difference is in hundreds of degrees. Insufficient insulation results in, for example, an undesirable waste of cryogenic liquids due to inward heat transfer and the resulting boil-off and venting of part of the liquid.

A number of "super insulations" have been developed for applications requiring very high thermal insulation efficiency. These include multi-layer metalized plastic sheets, low density foam, etc. These insulation arrangements, while generally effective, tend to be complex, cumbersome and difficult to install and maintain on large structures. Foam often must be cut to shape from large blocks and installed piece by piece. Attempts to form foam in place directly on structures has had only limited success due to difficulties in forming insitu foam layers of uniform low density and thickness. Spraying a self-rising foam directly on a structure tends to produce layers of very uneven thickness with an undesirable rind or skin on the outside surface which are difficult and expensive to machine to a uniform thickness. Applying foam within a closed mold in contact with the structure tends to produce layers of higher density than desired, and of uneven density, since the foam cannot fully expand. Cutting holes in the mold to permit excess foam to extrude therefrom has not been successful since the resulting layer has uneven density, lower near the holes and higher elsewhere. Also, the backpressure resulting from the force needed to push excess foam through the holes tends to cause the layer to have a higher than desirable average density. The surface of the foam in contact with the mold walls tends to form an undesirable rind. Because of these difficulties in producing uniform foam insulation layers, many cryogenic applications must use the much more costly and complex multi-layer insulation systems.

Many of the problems of non-uniformity and expense are aggravated where a very large structure must be coated by covering many small contiguous areas one at a time. While devices have been designed for continuously producing long panels or slabs of foamed materials, these produce foam of higher density than is required for insulation purposes, and the foam tends to be uneven in density.

Thus, there is a continuing need for improved high efficiency insulation coatings, especially for the insulation of very large structures containing materials at cryogenic temperatures.

SUMMARY OF THE INVENTION

It is, therefore, an object of this invention to provide an apparatus for forming an insulation layer overcoming the above-noted problems.

A further object of this invention is to provide an apparatus for producing a layer of foam having uniform low density and height characteristics.

Yet another object of this invention is to provide an apparatus for rapidly and continuously forming a uniform foam layer over large surfaces.

The above objects, and others, are accomplished in accordance with this invention by an apparatus for continuously forming uniform low density coatings on large structures. The apparatus includes means for uniformly applying a self-rising foamable liquid to a moving surface, means for positioning a screen adjacent and parallel to the surface and for moving the screen so as to avoid relative movement between screen and surface, downstream rotating brush means for abrading and comminuting excess foam which has expanded up through the screen and cured to a self-sustaining state, and means for removing the comminuted excess foam and the screen from the foam coating surface.

The foam may be applied in any suitable manner. In a preferred embodiment, the foam liquid is sprayed on the surface, the screen is placed over the foam and the foam expands up through the screen. Alternatively, with relatively large mesh screens and liquid foam pressures, the foam liquid may be sprayed or poured onto the surface through an in-place screen.

Any suitable liquid foamable material may be used. Typical foamable materials include synthetic resin materials which include a chemical "blowing agent" which reacts, releasing a gas which forms foam pores within the liquid. Other foamable liquids, for example, may include dispersed volatile liquids which form local pores upon heating or lowering of ambient pressure. The foam material itself may be any suitable material which can be foamed in a liquid state, then cured or solidified to a self-sustaining state. The resin may be cured, for example, by a catalytic reaction, heat, etc. If desired, various materials may be added to the foamable liquid to modify its properties. For example, finely chopped glass fibers may be added to increase the strength of the foam.

Typical foam materials include urethane, polyethylene, vinyls, epoxys, silicones, phenolics, urea-formaldehydes, fluorocarbons, and mixtures and copolymers thereof.

The most effective foam for insulation purposes has the lowest reasonably achievable density; that is, has the greatest proportion of small bubbles and smallest proportions of resin per unit volume. "Low density" as used in this application is a relative term which indicates a density approaching that achieved when a foamable material is allowed to foam and increase in volume without mechanical restriction. Actual density achieved, of course, varies with foam materials, pressure and temperature. Density increases when free foaming is restricted, e.g. by foaming in a closed mold or one with restricted openings for release of excess foam. Similarly, non-uniform restrictions on the foaming material will cause uneven final density. For example, a mold with few, widely spaced, openings for release of excess foam will have higher density away from the openings and lower density near the openings. In an insulation system, the lowest foam density consistent with reasonable mechanical strength in the coating is preferable for maximum insulation effect. Uneven density is also undesirable in insulation because of the varying temperature gradients through regions of higher and lower density and possible resulting "hot spots" over high density areas.

If desired, the foam layer may include reinforcements or other additives, such as scrim cloth embedded in the foam parallel to the supporting surface, chopped fibers mixed with the foamable liquid, studs extending outwardly from the surface, etc.

The foam layer may be treated in any suitable manner after the screen is stripped away. For example, the surface may be lightly sanded to remove any roughness produced by the screen, coatings may be applied to seal the foam, cover sheets may be laminated onto the exposed surface, additional layers of foam may be applied, etc.

BRIEF DESCRIPTION OF THE DRAWINGS

The drawings illustrate several preferred embodiments of the apparatus of this invention. In the drawings:

As seen in FIG. 1, a plurality of upstanding pins or studs 10 are secured to the surface of structure 12 which is to be coated with a foam layer. Studs 10 should have a height slightly greater than the thickness of the desired foam layer, and should be spaced closely enough to maintain a substantially even, taut screen therebetween. Typically, studs 10 may be spaced 2–4 feet apart. Any suitable material may be used for studs 10 and structure 12. Typical materials include metals such as aluminum or steel, synthetic resins, glass, etc. The studs may be secured to the structure surface in any suitable manner, such as by welding, adhesive bonding, or insertion into shallow holes.

Figure 1:
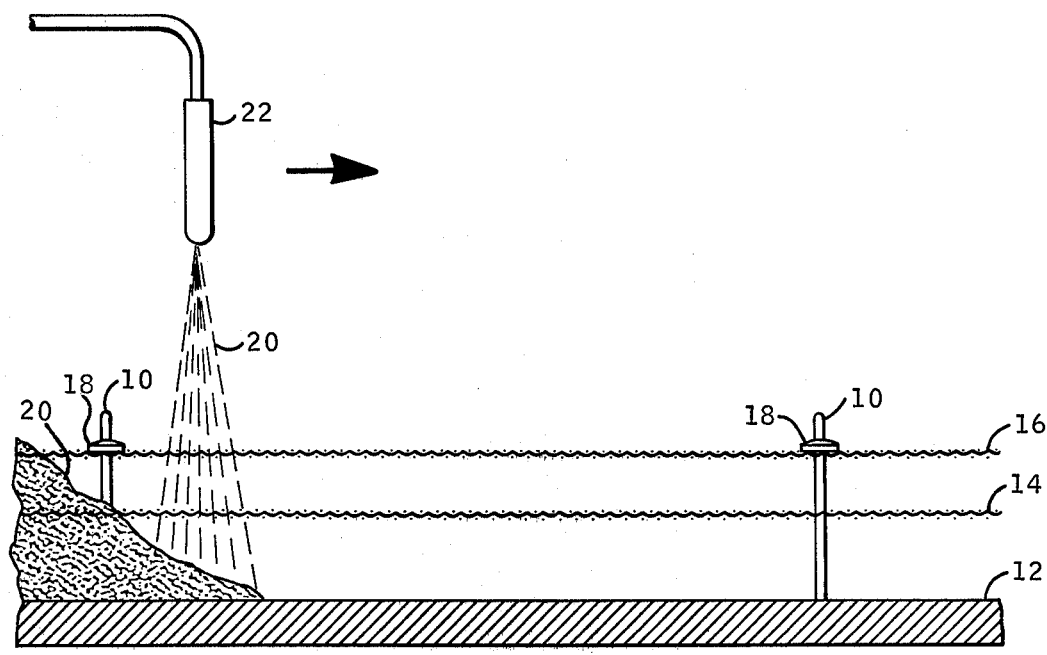
FIG. 1 is a schematic section through the screen and surface assembly taken perpendicular to the surface prior to application of a foam layer.

If desired as a reinforcement for the foam layer, one or more sheets of scrim 14 may be stretched taut and slipped down over studs 10. Any suitable material may be used for scrim, in any suitable weave. Typical materials include polyester fibers, such as those available under the trademark "Dacron" from E. I. dePont de Nemours, Inc., glass fibers, fine metal wires, nylon, etc. The fibers may be coated to increase adhesion to the foam material, if desired. Typical mesh sizes range from about 10 by 10 to about 4 by 4 thread strands per inch. Preferably, thread thickness should be no greater than 0.005 inch. Up to five spaced scrim sheets, each having a maximum fiber diameter of 0.005 inch and minimum, net-like, thread spacing of no less than about 0.1 inch may be used without excessive back pressure on the expanding foam.

After the scrim 14, if any, and any other objects to be imbedded in the foam are positioned, a sheet of screen material 16 is stretched taut and lowered over studs 10. Preferably, friction holding disks 18, which may typically be either "Tinerman" washers, split rings or thin plastic disks having slits or holes slightly smaller than the stud diameter, are slipped down over studs 10 to hold screen 16 at the selected distance above surface 12. Disks 18 have a sufficiently tight friction fit on studs 10 to prevent screen 16 from being moved up as the foam expands. Since the upward force on screen 16 from the expanding foam is not great, disks 18 do not require an extremely tight fit on studs 10.

Screen 16 may be constructed from any suitable material woven in a suitable mesh size. The screen fibers should occupy less than 30% of the screen area to provide the least possible resistance to foam expansion. Where the screen occupies more than 30% of the screen area, the foam has been forced to expand less than the desired amount and foam density is higher than desired due, apparently, to resistance to flow through the screen and resulting "back pressure" on the foam. While optimum results are probably obtained where the proportion of screen fibers to open area approaches zero, screen strength with excessively thin strands is too little to permit removal of excess foam by stripping away the screen. Also, if the mesh spacing is too great, an undesirably rough foam surface will be left. The screen should have the smallest fiber diameter and mesh size consistent with providing at least 70% open area and sufficient strength for the stripping operation. Small mesh size tends to produce a smoother final foam surface. Typical mesh sizes range from about 4 to about 8 threads per inch, with from about 4 to 5 threads per inch giving the optimum combination of stripping effectiveness and low resistance to foam expansion. Fiber diameters in the 0.02 to 0.06 inch range are typical, with the finer fibers being most effective. Typical screen fiber materials include metals, such as aluminum and stainless steel, copper, brass, monel and galvanized steel, glass, synthetic resins, such as nylon, fluorinated ethylene or propylene, natural fibers such as cotton and wool, and combinations thereof. Of these, galvanized steel is preferred because of its high strength, stiffness and low cost. Rather than woven mesh screens, perforated metal sheets having at least 70% open area and very small webs between perforations may be used, as may netting of the sort often molded or extruded from synthetic resins, such as polyolefins. If desired, the screen may be coated or treated to reduce wetting by and adhesion to the foam material. Best results are obtained in general with a woven mesh of about 0.02 inch galvanized wire mesh with a mesh spacing of about 0.25 inch, which provides about 80–90% open area. This provides the optimum combination of low resistance to foam flow, sufficient screen strength for the stripping step, and sufficiently small mesh size for a smooth foam surface.

While, as discussed above, the foamable liquid may be applied in any suitable manner, spraying of foamable material 20 by spray head 22 through screen 16 is preferred. As sprayed, foam material 20 is in a very liquid, low viscosity state, which passes through screen 16 and scrim 14 without building up thereon. The foam then expands, due to a chemical reaction or other gas bubble producing mechanism. Spray head 22 is moved relative to surface 12 as indicated by the arrow adjacent to head 22 in FIG. 1, to deposit a substantially uniform layer of foamable liquid over surface 12. Spray head 22 and/or surface 12 may be moved in any suitable pattern to provide this approximately uniform application. As seen in FIG. 1, with rapidly expanding material, the foam forms immediately behind spray head 22. More slowly foaming materials would form a liquid foamable material over surface 22 and would foam more levelly, so that the foam slope shown in FIG. 1 would be more gradual.

Figure 2:
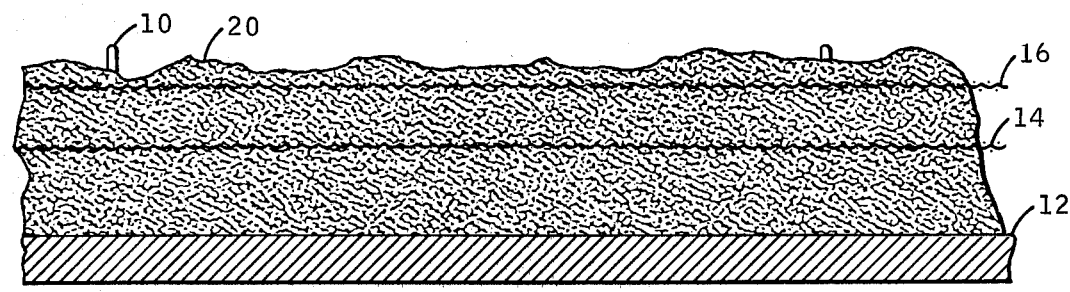
FIG. 2 is a schematic illustration of the assembly of FIG. 1 after the application of the foam.

As seen in FIG. 2, foam 20 expands up through scrim 14 and screen 16, finally forming an irregular upper surface with a thin skin or rind of cured material on the outer surface. Scrim 14 may be carried upwardly very slightly by the rising foam. If the final position of scrim is important, experience will teach the level at which scrim 14 should be positioned to give the desired final position for a particular foam composition.

Once foam 20 has cured to a self-sustaining, shape-retaining state, screen 16 can be removed. Of course, foam 20 can be completely cured before screen 16 is removed. If "Tinerman" washers are used for retaining disks 18,, conventional end cutters are used to clip off the ends of studs 10 adjacent to disks 18. The cutters can simply be pushed down through foam 20 along studs 10 until disks 18 are touched, then the studs are snipped off. If disks 18 are, for example, slit plastic disks or split rings which are reasonably freely slidable along studs 10, the ends of the studs need not be removed.

The excess material extending through the screen may be removed in any suitable manner. With many foam materials, the screen is preferably stripped away after the foam has reached a shape-retaining, self-sustaining state but before the foam is fully cured, to prevent spalling or tearing of the foam layer which may adhere too strongly to the screen when fully cured. The screen may be removed by lifting one edge, then rolling the screen over the surface to pull the screen away primarily in tension. Alternatively, the screen may first be moved slightly in a direction parallel to the desired foam surface to shear the foam portions extending through the screen. For example, with 0.25 inch spaced grid (mesh), the screen might be moved about 0.3 inch parallel to the surface to shear foam extruding through the mesh, then be lifted away. This technique often produces a smoother foam surface. If desired, the foam extending through the screen may at least partially be removed prior to removal of the screen. Typically, after partial cure of the foam, a doctor blade or rotating stiff brush may be moved along the upper screen surface to remove at least part of the excess foam.

Figure 3:
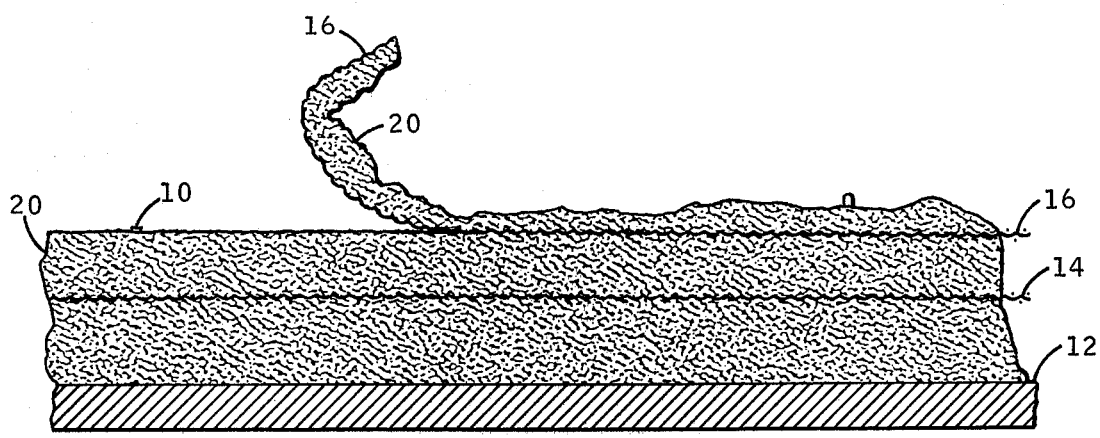
FIG. 3 is a schematic illustration of the assembly of FIG. 2 showing the removal of the screen.

As seen in FIG. 3, screen 16 and the portion of foam 20 above the screen are removed in the embodiment shown by manually stripping the screen away. Pre-clipped studs 10 will protrude above foam 20 only very slightly. Unclipped studs 10, or the slight stub remaining after pre-clipping can be removed, if desired, with conventional wire cutters. If desired, disks 18 may be replaced on unclipped studs 10 after screen removal to act as secondary foam retainers in case of bond failure between the foam and surface 12. Most foam materials will automatically bond to surface 12 as the foam cures.

The substantially smooth foam surface can be treated in any suitable manner. After screen stripping, the foam surface will be slightly rough, with slight peaks or depressions within the area of each screen opening. This roughness may be desirable as an excellent bonding surface against which sheet materials can be adhesively laminated. If desired, the surface can be lightly sanded for improved smoothness.

Figure 4:
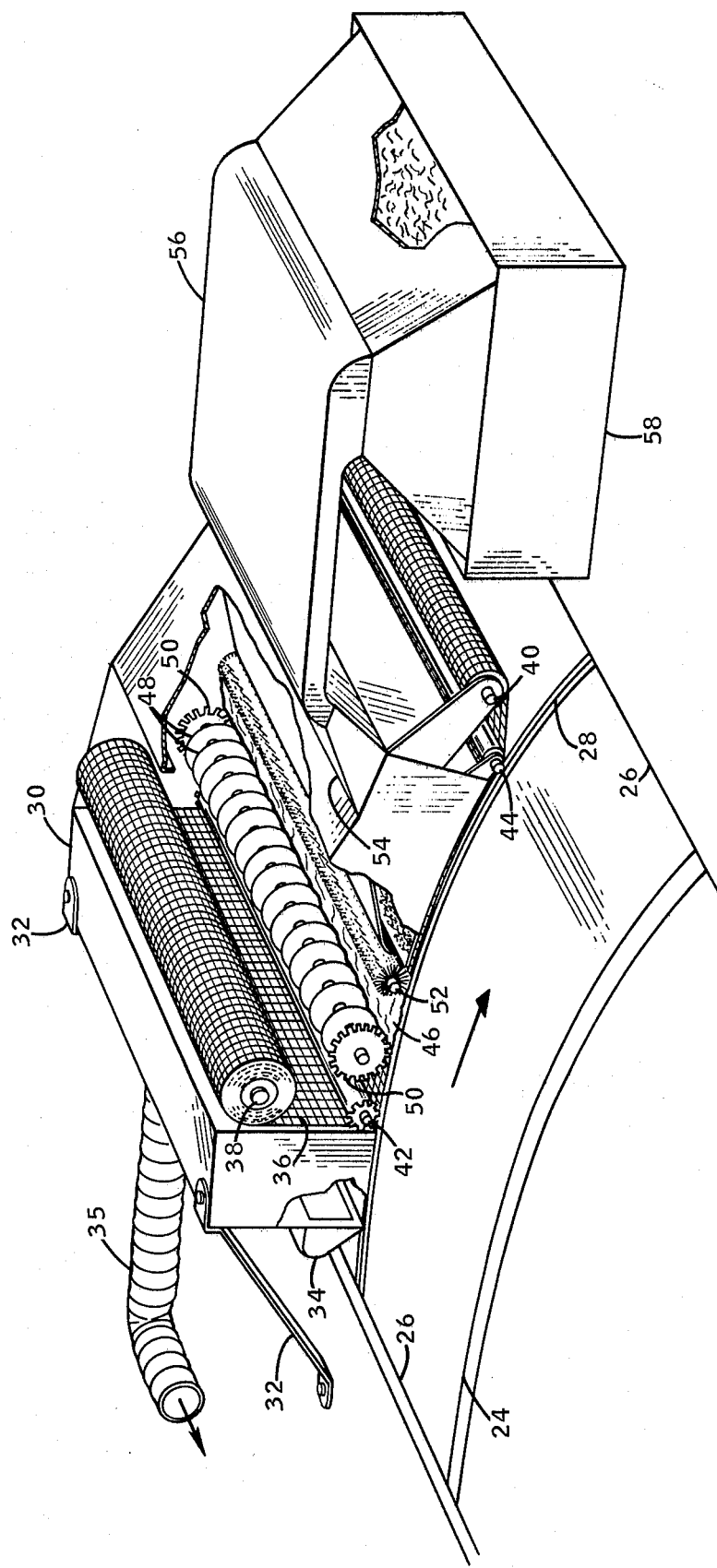
FIG. 4 is a schematic perspective view of an automatic device for continuously forming uniform foam layers on a large surface. DETAILED DESCRIPTION OF THE INVENTION Three major steps in the basic process of producing uniform thickness, low density foam layers are illustrated in FIGS. 1, 2 and 3. This less automated method is the basis for the preferred continuous apparatus shown in FIG. 4.

A preferred embodiment of a system for continuously coating large surfaces with a uniform foam layer is schematically illustrated in FIG. 4. As shown, the automated device is arranged to form a foam layer in a continuous band around a very large cylindrical tank 24, of the sort which might be used for a cryogenic fuel tank for a very large space launch vehicle. Of course, the device could be used in the same manner to apply foam layers to elongated flat surfaces. Tank 24 is rotated about a horizontal axis beneath an opening in a horizontal deck 26. The foam application and leveling apparatus are synchronized with the tank rotation speed in any conventional manner. The foam is applied in a strip bounded on one side by a close-out ridge 28 (which may be attached to tank 24 for rotation therewith, or the deck 26 for sliding engagement with tank 24), and on the other either by the prior cured strip of foam or by another close-out ridge (not shown). Since the foam along the edge of close-out ridge 28 may be of slightly higher and non-uniform density, since it is slightly restrained in expansion and may have an edge rind, it may be desirable to trim a small amount from the edge of the foam layer before the next adjacent layer is formed, so that the entire length of the tank will be more uniformly coated.

The liquid foam material is applied by a series of conventional spray means (not shown) such as Gusmer Modell FF spray guns within housing 30. Housing 30 is supported by straps 32 connected to deck 26. Gases or vapors, which might be toxic, are vented from housing 30 through duct 34 in the back of housing 30 and vent tube 35. As tank 24 turns, the rising foam moves under a screen 36 which is fed from supply roller 38 to take-up roller 40 in synchronism with the tank rotation. Guide rollers 42 and 44 guide screen 36 at the selected distance from the outer surface of tank 24 so that there is no relative movement between the rising foam and the screen. As the foam rises, it expands through screen 36 at about 46. At least one hold-down assembly 48, consisting of a plurality of spaced hold-down disks engages screen 36 to hold it at the selected height against any upward pressure of the rising foam. Preferably, at least the edge disks are in the form of cog wheels 50 which engage the screen mesh and maintain it in tension. For clarity of illustration, the various conventional drive means for the several rollers, brushes, etc. are not shown.

The distance between the foam liquid applicators within housing 30 and brush 52 is selected to be sufficient at the rate of rotation of tank 24 to assure that the foam has cured to a self-sustaining state when it reaches brush 52. Brush 52 is rotated at high speed to brush foam extending above screen 36 into housing 54. A conventional vacuum suction means (not shown) within housing 54 directs foam chips through duct 56 to a storage or disposal container 58. Brush 54 can be set close enough to screen 36 to effectively remove excess foam without the danger of overly abrading or tearing the foam below the desired final layer thickness. In the absence of screen 36, brush 52 would tend to tear out large chunks of foam, so that tears and holes would extend below the desired level. The combination of brush and screen has been found to produce a smooth, level, undamaged foam surface.

This continuous machine will produce foam insulation layers of uniform thickness and uniform low density over large areas. As can be seen from FIG. 4, the device is readily adaptable to coating a variety of structures. Each component is conventional so that one skilled in the art can select components and sizes to fit specific applications. For example, with some foam materials, two or more closely spaced hold-down assemblies 48 might be desirable, and in some applications an endless loop screen 36, continuing from the surface past take-up roller 40 to supply roller 38 might be preferred. In any of these, the basic features of foaming up through an open mesh, precisely positioned, screen, brush means for comminuting the excess and means to remove the screen and excess foam, would be embodied.

The operation of the apparatus of this invention is illustrated by the following specific example of a typical installation of the sort shown in FIG. 4. All parts and percentages are by weight, unless otherwise indicated.

A cylindrical aluminum tank having a diameter of about 20 feet is positioned with its axis horizontal in a jig which permits rotation about the axis, with the upper wall portion projecting through a deck. An apparatus of the sort shown in FIG. 4 is mounted on that deck. A pair of 4 inch high close-out ridges are secured around the tank about 6 feet apart. A roll of screen having a width of just over 6 feet and a length of about 80 feet is installed between the feed and take-up rollers. The screen has a 0.02 inch diameter galvanized wire mesh on a square, 0.25 inch, mesh arrangement. A hold-down assembly having 0.1 inch thick aluminum disks spaced every 1 inch and cog wheels at the ends to engage the screen edges along the close-out ridges is installed. A row of Gusmer spray guns, proportioning units Model FF, from Gusmer Inc. with 52.17 to 47.83 ratio pumps, spray a uniform coating of foamable liquid on the tank surface as it rotates. The foamable liquid consists of about 100 parts polyether triol (3000 molecular weight), about 38 parts of an 80:20 mixture of the 2,4 and 2,6 isomers of toluene diisocyanate, about 1 part stanous oleate, about one part ethyl morpholine, about 1 part silicone copolymer surfactant and about 2.9 parts water. As the foam rises, due to generation of carbon dioxide bubbles by reaction of the diisocyanate and water, and cures through the polymerizing reaction of the diisocyanate, polyol and water, the foam expands up through the screen in the region of the hold-down assembly. As the foam moves with the screen, it cures to a self-sustaining state where it encounters a rapidly rotating brass bristle brush which is positioned so that the bristles just contact the screen. The excess foam above the screen is abraded and comminuted. The foam particles are withdrawn by the vacuum system. The screen is lifted away to a take-up roll. The resulting foam surface is uniform and level, with no significant pits or tears in the foam surface. The foam is ready for any further smoothing or coating steps desired.

While certain specific materials, components and arrangements were described in detail in the above description of preferred embodiments, these may be varied and other components and arrangements may be used, where suitable, with similar results. Various modifications, applications and ramifications of the present invention will occur to those skilled in the art upon reading the present disclosure. These are intended to be included within the scope of this invention, as defined in the appended claims.

I claim:

1. Apparatus for forming a layer of foam having uniform low density and uniform thickness on a surface which comprises:
    means for applying a self-rising foam material in a liquid, unexpanded state onto a surface;
    means for moving said surface in a direction substantially in the plane of said surface;
    means for positioning a screen substantially parallel to said surface at a selected distance from said surface;
    said screen having a substantially uniform pattern of openings, said openings comprising at least about 70% of the screen area;
    means for moving said screen parallel to said surface without relative movement between said screen and said surface as said foam rises through said screen and cures to at least a shape-retaining state;
    rotary brush means adjacent to said screen to abrade and comminute excess foam extending through said screen; and
    means for removing said screen and any remaining excess foam extending through said screen.

2. The apparatus according to claim 1 wherein said screen moving means comprises:
    a screen feed roll;
    a first guide roller positioning said screen at said selected distance from said surface upstream of the area at which said foam begins to expand up through said screen;
    at least one hold down array comprising a plurality of thin disks engaging the upper side of said screen substantially in the area at which said foam expands up through said screen to prevent the expanding foam from lifting said screen;
    a second guide roller downstream of said rotary brush means; and to guide said screen away from the position substantially parallel to said surface; and
    a take-up roll to receive said screen from said second guide roller.

3. The apparatus according to claim 2 wherein said means for applying foam material comprises a plurality of foam spray means in a line substantially parallel to, and just upstream of, said first guide roller.

4. The apparatus according to claim 1 wherein said screen is a metal wire mesh having wire diameters of from about 0.02 to 0.06 inch and mesh sizes of from about four to about eight wires per inch.

5. The apparatus according to claim 1 further including a hood substantially covering said screen adjacent to said brush and vacuum suction means to remove foam chips on said screen as said chips accumulate under said hood.

* * * * *